(12) United States Patent
Chan et al.

(10) Patent No.: US 8,120,833 B2
(45) Date of Patent: Feb. 21, 2012

(54) VARIABLE SPACE SHUTTER FOR LED DISPLAY

(75) Inventors: Kui Lai Curie Chan, Kowloon (HK); Alan Kin Lun Choi, Kowloon (HK)

(73) Assignee: Lighthouse Technologies Limited, Kwon Tong, Kowloon (HK)

( * ) Notice: Subject to any disclaimer, the term of this patent is extended or adjusted under 35 U.S.C. 154(b) by 0 days.

(21) Appl. No.: 12/954,131

(22) Filed: Nov. 24, 2010

(65) Prior Publication Data
US 2012/0008186 A1 Jan. 12, 2012

Related U.S. Application Data

(60) Provisional application No. 61/362,593, filed on Jul. 8, 2010.

(51) Int. Cl.
*G02B 26/02* (2006.01)
(52) U.S. Cl. .......................................... 359/233; 353/88
(58) Field of Classification Search .................. 359/233; 353/88
See application file for complete search history.

(56) References Cited

U.S. PATENT DOCUMENTS

| 1,767,756 A | 6/1930 | Hall |
| 2,995,079 A | 8/1961 | La Fontaine |
| 4,392,187 A | 7/1983 | Bornhorst |
| 5,207,614 A | 5/1993 | Passadore |
| 6,769,777 B1 * | 8/2004 | Dubin et al. .................... 353/97 |
| 2005/0078125 A1 | 4/2005 | Yamada et al. |

FOREIGN PATENT DOCUMENTS
EP 0563483 A2 10/1993

OTHER PUBLICATIONS

Mar. 14, 2011 PCT Notification of Transmittal of the International Search Report and the Written Opinion of the International Searching Authority, or Declaration in connection with PCT/CA2010/001838.

* cited by examiner

Primary Examiner — James Phan
(74) Attorney, Agent, or Firm — Dickstein Shapiro LLP (57) ABSTRACT

A variable space shutter includes: a first frame having vertically spaced slats forming vertical openings; a second frame having a horizontal indented channel, the second frame being affixed to the first frame around a periphery of the first frame; and a shutter part having vertically spaced slats forming vertical openings, the shutter part being sandwiched between the first and second frames such that a portion of the shutter part rests within the horizontal indented channel to permit selective sliding movement of the shutter within the channel between a first position, wherein the vertical openings of the first frame line up with the vertical openings of the shutter part, to permit light to pass through the variable space shutter, and a second position, wherein the vertical openings of the first frame line up with the vertical slats of the shutter part, to block light from passing through the variable space shutter.

13 Claims, 11 Drawing Sheets

VARIABLE SPACE SHUTTER FOR LED DISPLAY

CROSS-REFERENCE TO RELATED APPLICATION

This application claims benefit under 35 U.S.C. §119(e) to U.S. Provisional Patent Application No. 61/362,593, filed Jul. 8, 2010, which is hereby incorporated by reference.

BACKGROUND OF THE INVENTION

The present invention relates to a variable space shutter for LED display. In a preferred embodiment, the shutter includes portions that allow the shutter to go from a light transmissive (open) state to light blocking (closed) state.

Conventionally, a backing mesh for an LED display is used, for example on a stage for a performance, to provide a backing for an LED light display. Typically, either a see-through screen, to allow light to pass through, or a solid type screen, to provide backing contrast, is provided.

However, with the conventional devices, it must be decided which of the see-through and solid panels is to be used for a particular application.

BRIEF SUMMARY OF THE INVENTION

In consideration of the above problems, in accordance with one aspect of the present invention, a variable space shutter comprising a first frame having vertically spaced slats forming vertical openings; a second frame having a horizontal indented channel, the second frame being affixed to the first frame around a periphery of the first frame; and a shutter part having vertically spaced slats forming vertical openings, the shutter part being sandwiched between the first frame and the second frame such that a portion of the shutter part rests within the horizontal indented channel to permit selective sliding movement of the shutter within the horizontal indented channel between a first position, in which the vertical openings of the first frame line up with the vertical openings of the shutter part, to permit light to pass through the variable space shutter, and a second position, in which the vertical openings of the first frame line up with the vertical slats of the shutter part, to block light from passing through the variable space shutter.

In another aspect of the present invention, the shutter part further comprising vertically oriented handles configured to facilitate a user moving the shutter part between the first position and the second position.

In another aspect of the present invention, the first frame further comprising a plurality of display mounting apertures configured to permit the mounting of LEDs within the apertures.

In another aspect of the present invention, the first frame further comprising a horizontal portion configured to facilitate mounting of electronics for driving a light display.

In another aspect of the present invention, the shutter part further comprising horizontal reinforcement members including oval shaped holes configured to accept screws to hold the shutter part in place within the variable space shutter and permit horizontal movement of the shutter part within the variable space shutter.

In another aspect of the present invention, the first frame further comprising a horizontal portion adapted to facilitate mounting of electronics for driving the light display.

In another aspect of the present invention, the second frame comprising side latches adapted to permit a variable space shutter to connect to at least one other variable space shutter to form a multi-panel variable space shutter array.

In a second aspect of the present invention, a multi-panel variable space shutter array comprising at least two variable space shutters, each variable space shutter comprising a first frame having vertically spaced slats forming vertical openings; a second frame having a horizontal indented channel, the second frame being affixed to the first frame around a periphery of the first frame, the second frame comprising side latches adapted to permit a variable space shutter to connect to at least one other variable space shutter; and a shutter part having vertically spaced slats forming vertical openings, the shutter part being sandwiched between the first frame and the second frame such that a portion of the shutter part rests within the horizontal indented channel to permit selective sliding movement of the shutter within the horizontal indented channel between a first position, in which the vertical openings of the first frame line up with the vertical openings of the shutter part, to permit light to pass through the variable space shutter, and a second position, in which the vertical openings of the first frame line up with the vertical slats of the shutter part, to block light from passing through the variable space shutter, wherein each variable space shutter in the array is: individually adjustable between the first and second position; and affixed to at least one other variable space shutter by operation of the side latches.

In another aspect, the shutter part of each variable space shutter further comprising vertically oriented handles configured to facilitate a user moving the shutter part between the first position and the second position.

In another aspect, the first frame of each variable space shutter further comprising a plurality of display mounting apertures configured to permit the mounting of LEDs within the apertures.

In another aspect, the first frame of each variable space shutter further comprising a horizontal portion configured to facilitate mounting of electronics for driving a light display.

In another aspect, the shutter part of each variable space shutter further comprising horizontal reinforcement members including oval shaped holes configured to accept screws to hold the shutter part in place within the variable space shutter and permit horizontal movement of the shutter part within the variable space shutter.

In another aspect, the first frame of each variable space shutter further comprising a horizontal portion adapted to facilitate mounting of electronics for driving the light display

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

Figure 1:
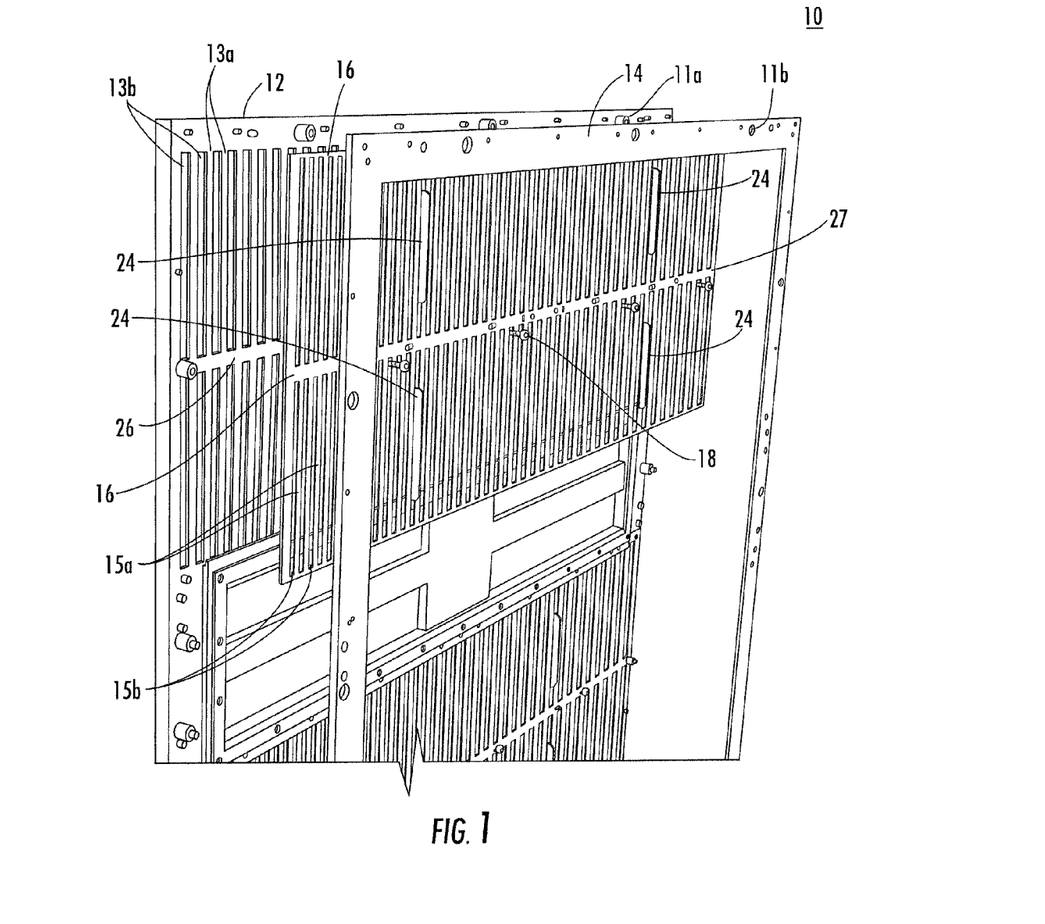
FIG. 1 is an exploded view of a variable space shutter in accordance with an embodiment of the present invention.
Figure 2:
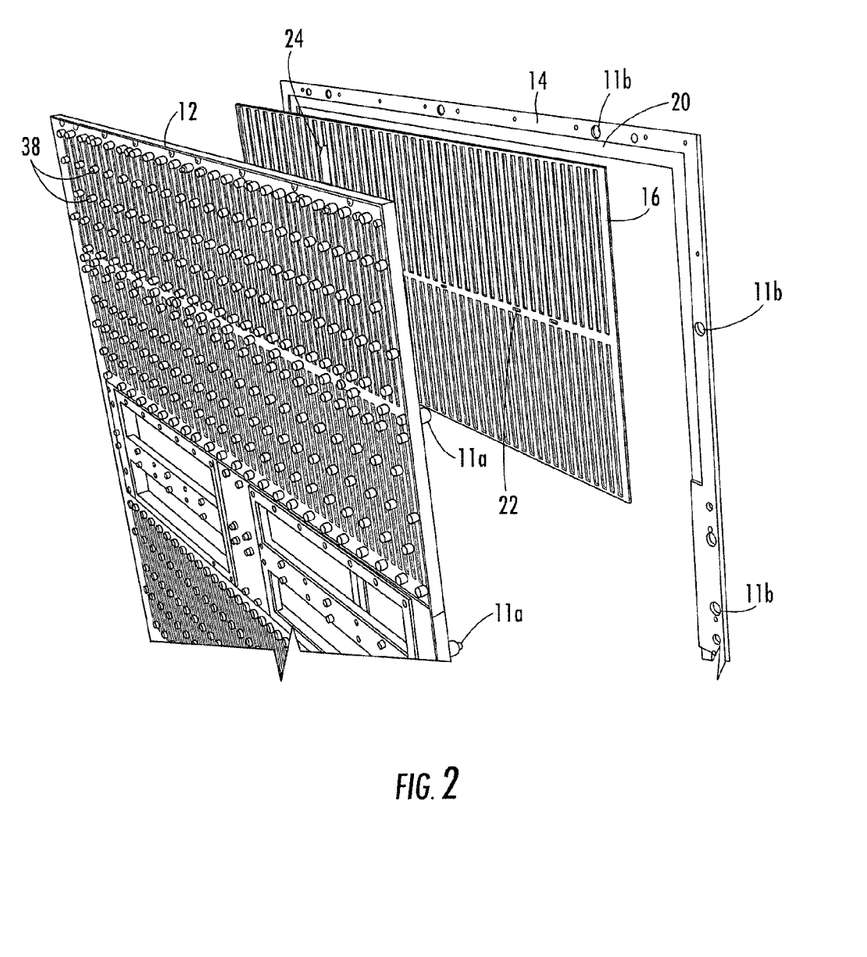
FIG. 2 is an exploded view of a variable space shutter in accordance with an embodiment of the present invention.
Figure 3:
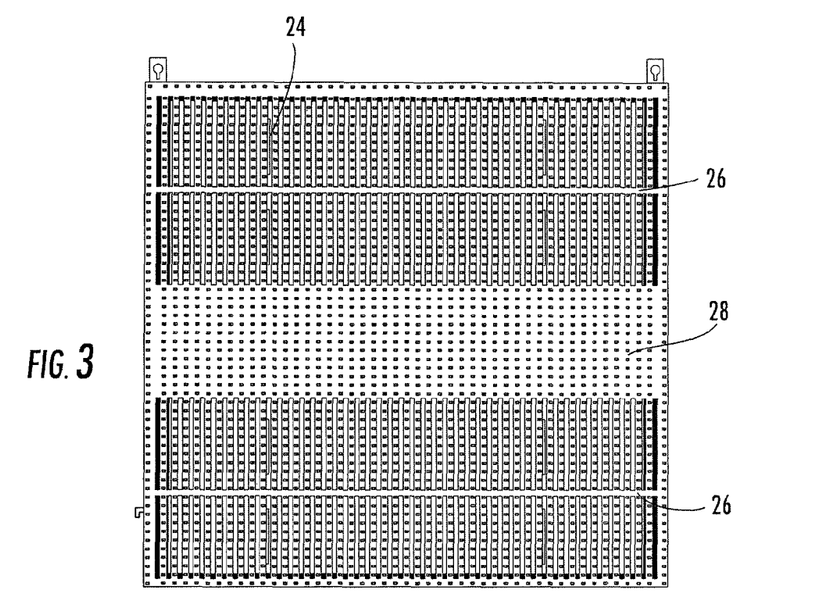
FIGS. 3 and 4 are front and back views of a variable space shutter in accordance with an embodiment of the present invention with a back box attached thereto.
Figure 4:
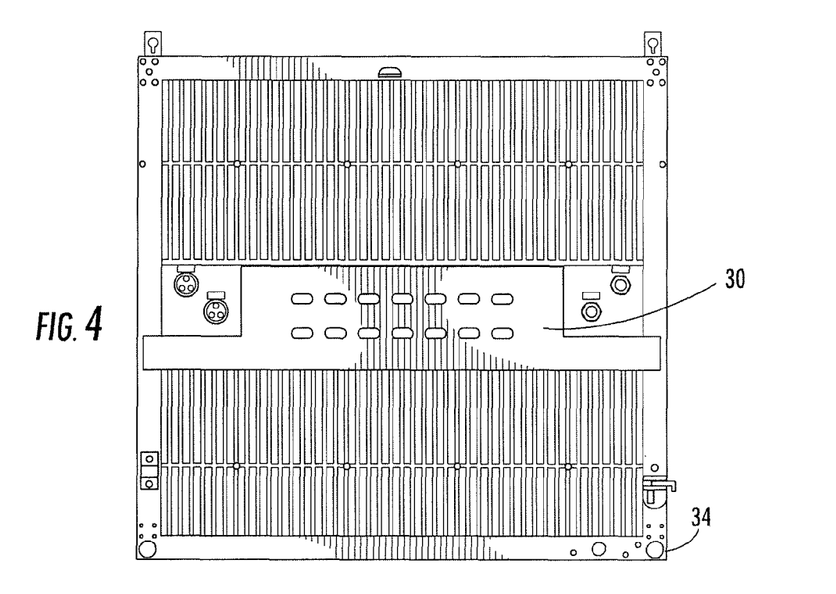
Figure 5:
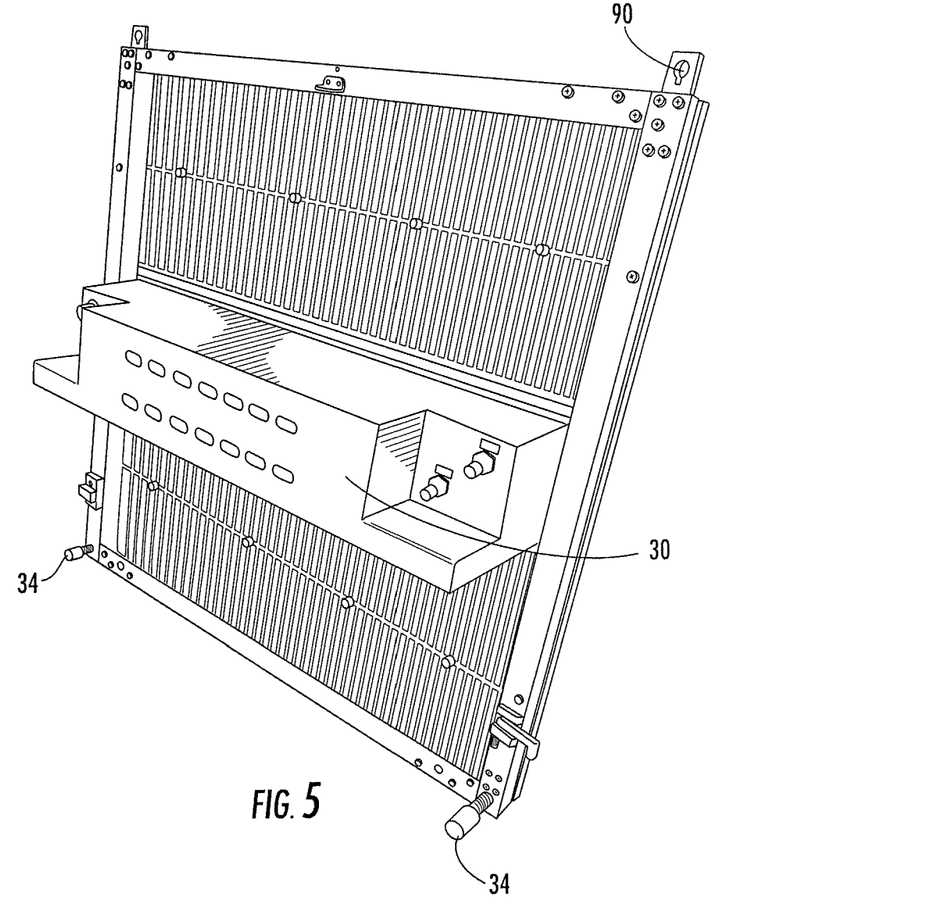
FIG. 5 is a perspective rear view of a variable space shutter in accordance with an embodiment of the present invention with a back box attached thereto.
Figure 6:
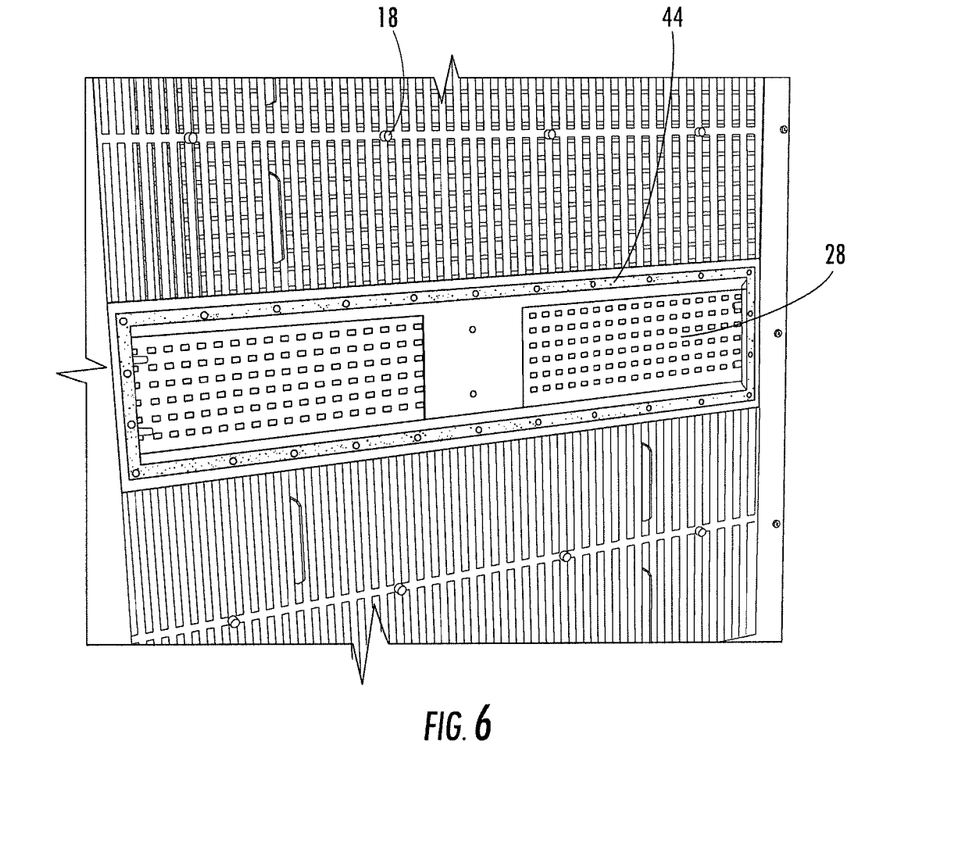
FIG. 6 is a back view of a variable space shutter in accordance with an embodiment of the present invention, without the back box being attached.

FIGS. 1-8 and 10-14 illustrate a preferred embodiment of variable space shutter 10 in accordance with the present invention. As can be seen in the figures, a variable space shutter in accordance with the present invention is formed of a first frame 12, a second frame 14, and a shutter part 16 that is sandwiched between the first and second frames. FIGS. 1 and 2 are exploded front and back views. The first frame 12 includes vertical slats 13a forming vertical openings 13b and a plurality of mounting holes with LEDs 38. The mounting holes are provided to mount LEDs for the display that utilizes the variable space shutter.

Screws 18, preferably socket-headed, are provided to hold the shutter part 16 in place and also allow for horizontal movement, within horizontal oval shaped holes 22. The screws 18 and holes 22 together allow sideways movement while keeping the shutter positioned between the frames 12 and 14 when the variable space shutter 10 is assembled. In a preferred embodiment, the screws can be adjusted to be loose enough to permit sliding of the shutter part 16, and, if required, tightened when the desired position of the shutter part 16 has been attained.

As can be seen most clearly in FIG. 2, a horizontal indented channel 20 is provided along an inner edge of the second frame 14. This channel 20 allows the shutter part 16 to slide from side to side when the variable space shutter 10 is in the assembled state. Male connecting portions 11a and corresponding female connecting portions 11b are provided around the edge of the variable space shutter 10 to line up and secure the frames 12 and 14 to one another.

The shutter 16 is formed so as to have plural vertical slats 15a forming vertical openings 15b arranged parallel to one another. The shutter 16 also includes vertical handles 24 that allow a user to manipulate the shutter 16 to move it within the channel 20 between a closed position and a see-through position, as will be discussed in more detail below.

Horizontal reinforcement members 26 are provided on the first frame 12 to help maintain structural integrity to assist in preventing deformation of the vertical portions of the slatted structure of the first frame. The shutter part 16 is preferably also provided with a horizontal reinforcement member 27, which performs a similar function to members 26.

A horizontal portion 28 is preferably provided in the first frame 12, which is for mounting a back box 30 that contains, e.g., electronic parts for driving the LED display and for supply signals and power, e.g., a transformer, driver boards, cables, connectors, etc. The horizontal portion 28, which includes mounting screw posts can be seen clearly in FIG. 6, which is a back view of the variable space shutter 10 without the back box 30 attached. The mounting screw posts can be located on a waterproof O-ring 44 surrounding horizontal portion 28. The electronics used in driving the LED display do not form a part of the present invention and the invention is not limited in that respect.

Portions 90 are provided at the top corner portions of the variable space shutter 10 to allow for the shutter 10 to be mounted by hanging or to otherwise secure the shutter 10. Bumpers 34 are provided at lower corners of the variable space shutter 10 to assist the shutter 10 to stand as a freestanding unit. Portions 90 and bumpers 34 can also be used to connect shutter 10 with another shutter 10 in a vertical array.

In operation, the variable space shutter 10 is adjustable to permit more or less light to pass through it, depending upon the relative positions of the vertical openings of the first frame 12 and the vertical openings of the shutter part 16. As is shown in FIGS. 10-14, by using the handles 24, a user can slide the shutter part 16 from an open position, i.e., light transmissive position, in relation to the first and second frames to a closed position, i.e., light blocking position. Moreover, the position of the shutter portion can be adjusted to provide differing amounts of light transmission.

Figure 10:
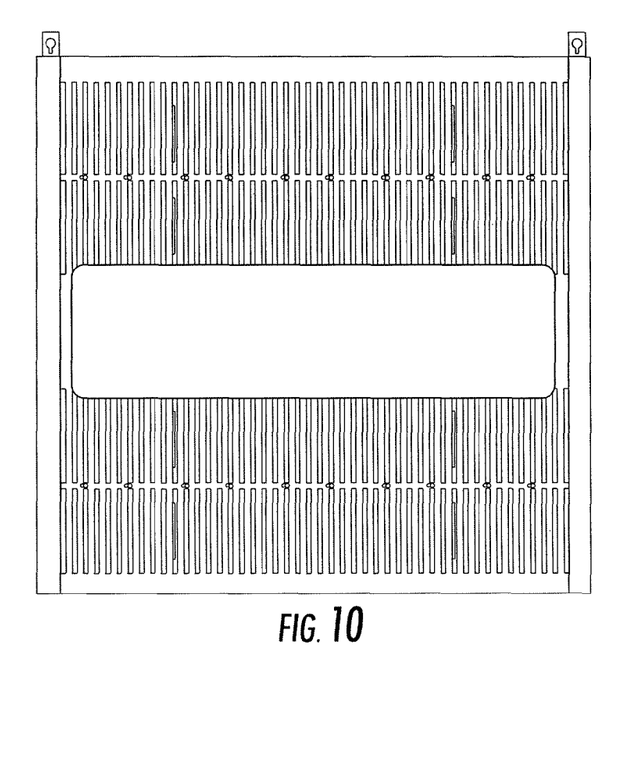
FIGS. 10-14 are front views of a variable space shutter in accordance with the present invention illustrating the open and closed positions of the variable space shutter.
Figure 11:
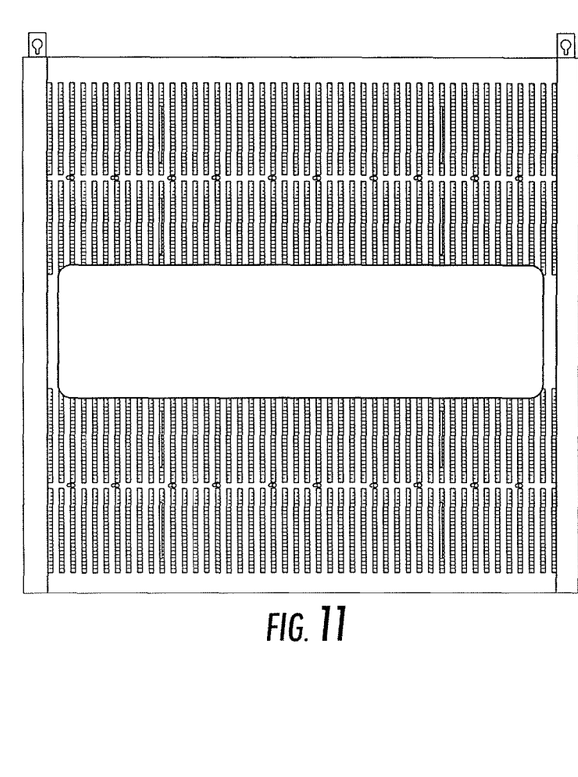
Figure 12:
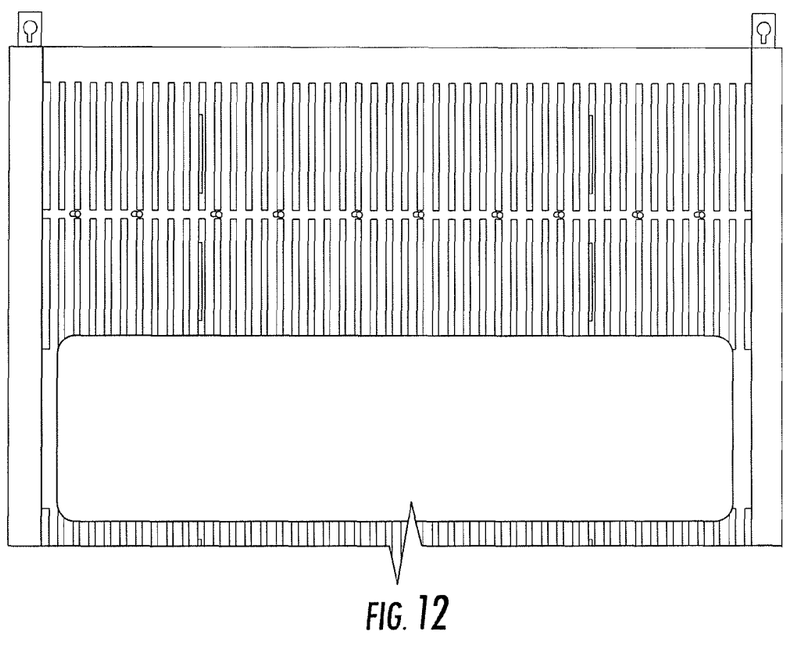

In an open configuration, as shown for example in FIGS. 10 and 12, the vertical opening slats 15a of the shutter part 16 line up with the vertical opening slats 13a of the first frame 12 to permit the maximum amount of light to pass through the variable space shutter 10. In the closed position, as shown for example in FIGS. 11 and 14, the shutter part 16 has been moved horizontally within the variable space shutter 10 so that the vertical opening slats 15a of the shutter part 16 are in line with the vertical openings 13b of the first frame 12. In this position, almost no light can go through the variable space shutter 10 and it functions like a solid screen. The ability to move between the open and closed positions allows the variable space shutter of the present invention to function selectively as a mesh type product and a solid panel type product.

Figure 13:
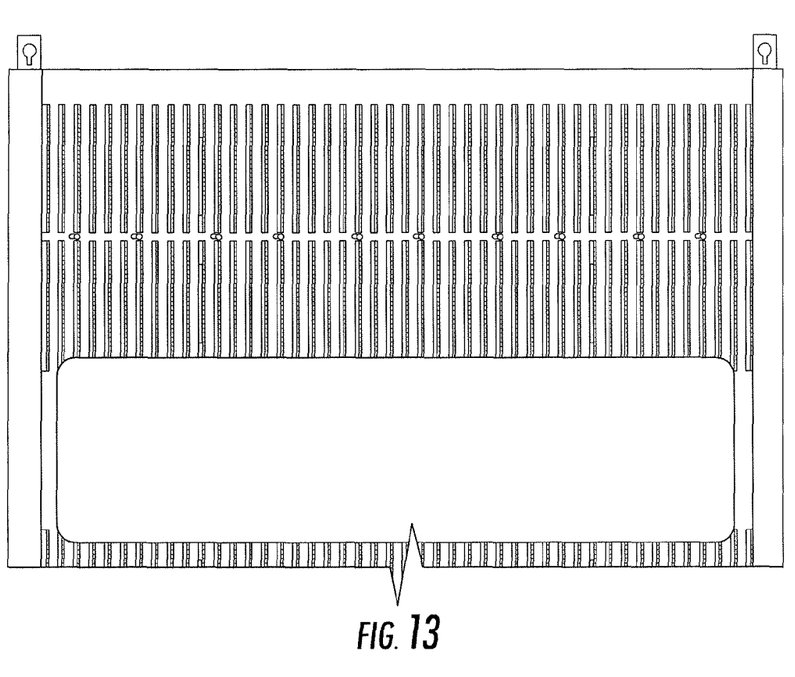
Figure 14:
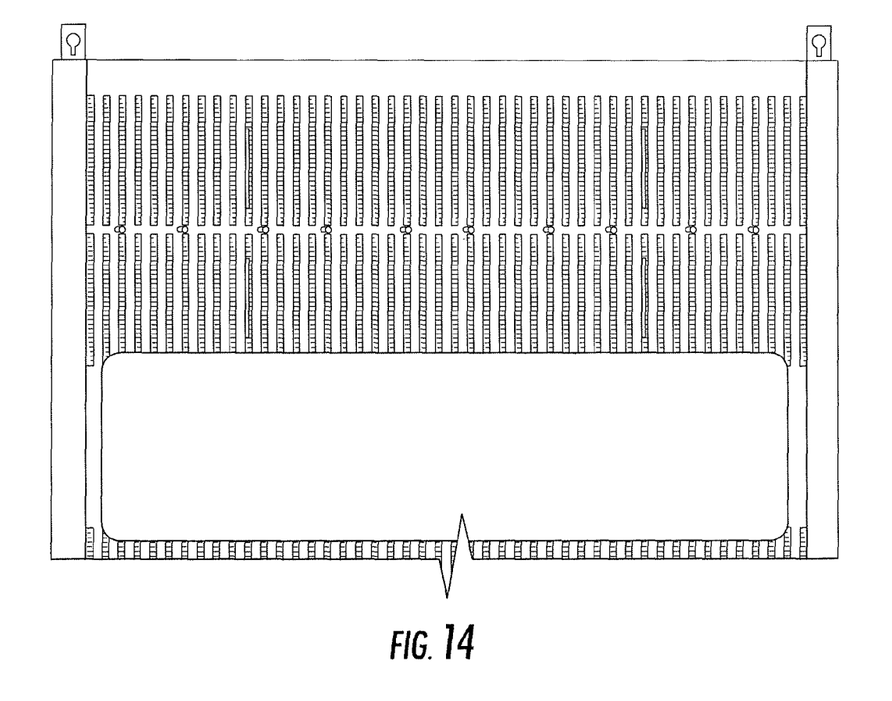

As can be seen in FIGS. 12-14, a preferred method moving from the closed to the open position is by the user manipulating vertical handles to slide the shutter part 16 from left to right. In FIG. 12 the shutter part 16 is positioned to the left. As the handles are used to move the shutter part 16 to the right, a partial blocking of the light transmission occurs, as shown in FIG. 13, in which the slats 15a partially cover the vertical openings 13b of the first frame. Once the shutter portion has been completely slid to the right side, the variable space shutter 10 is completely in the closed position.

Figure 8:
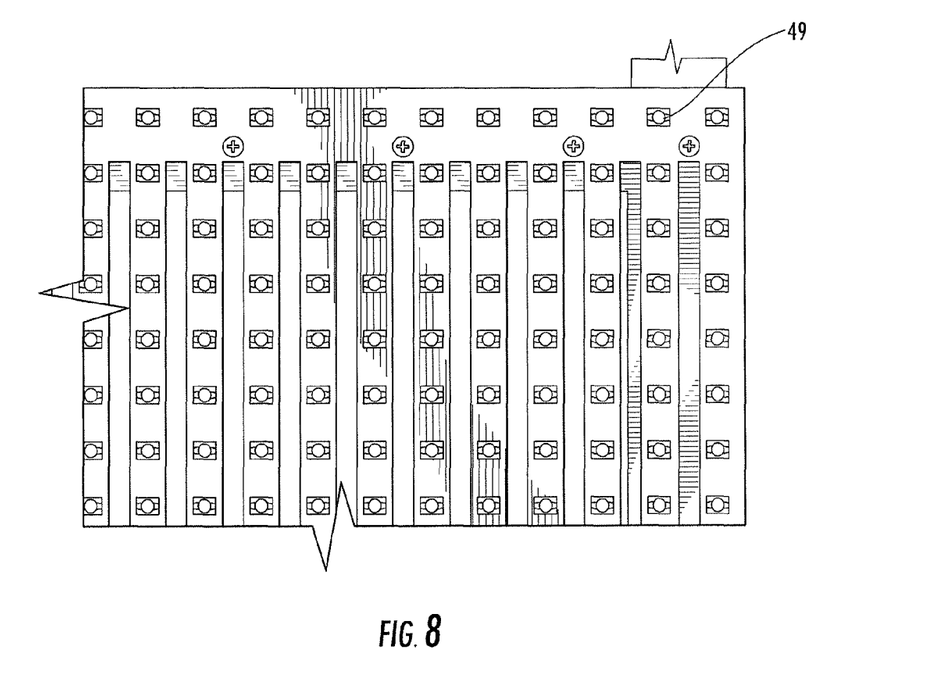
FIG. 8 is a close up view of a variable space shutter in accordance with an embodiment of the present invention.

In use, the variable space shutter 10 is provided with LEDs 49 in each of the mounting holes (apertures) 38, as can be seen in FIG. 8. The electronics from the back box 30 drives the LEDs to produce the desired display. The ability of the variable space shutter to be open or closed provides the user with the ability to have different backgrounds for the LED display.

Figure 7:
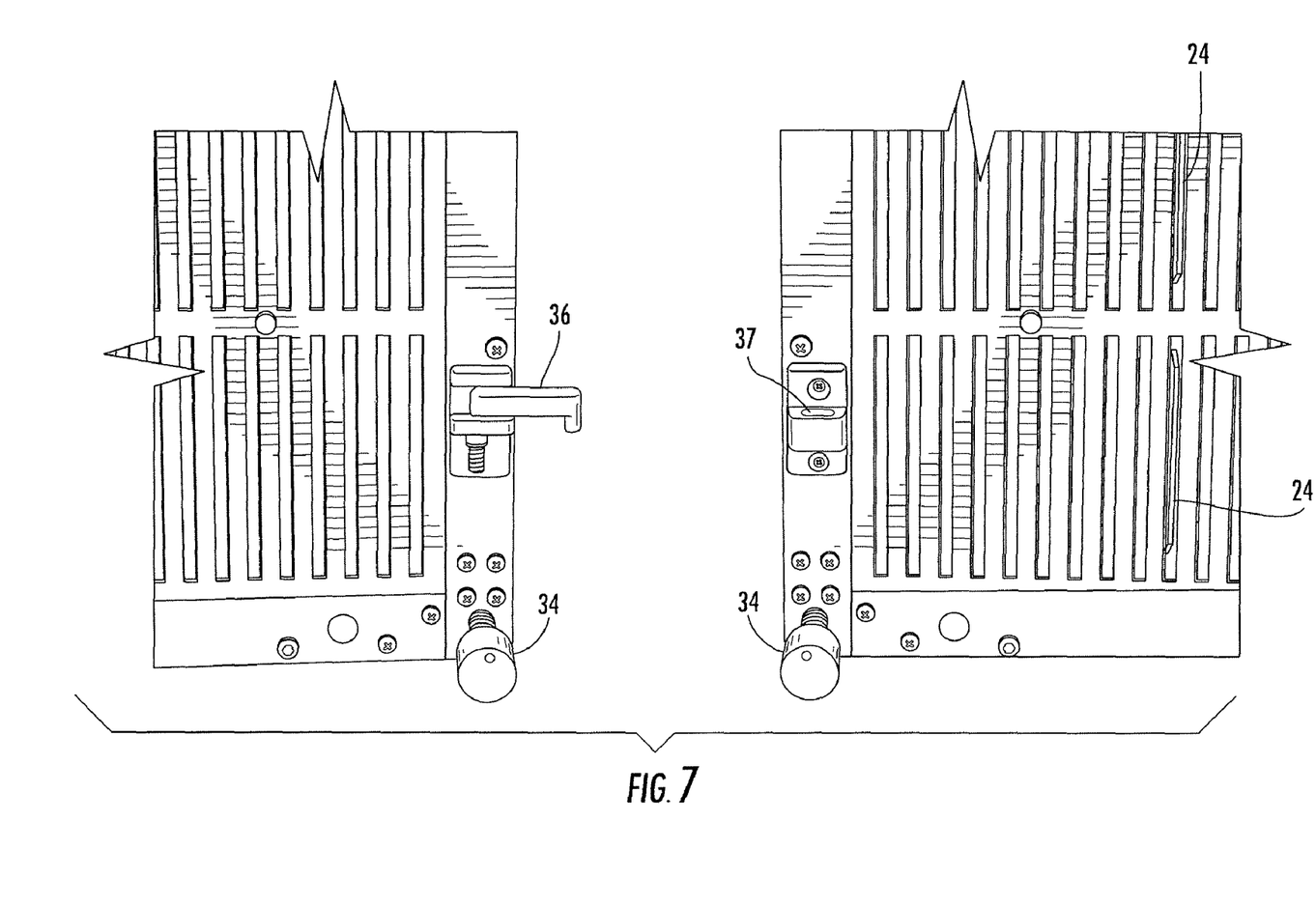
FIG. 7 is a view showing side latches of two variable space shutters in accordance with an embodiment of the present invention.

Each variable space shutter is configured to connect with variable space shutters to create a larger multi-panel structure that include a number of the individual shutter panels connected together. To promote this, each variable space shutter includes side latches 36 and 37, as shown in FIG. 7, that are used to aid in aligning and interlocking multiple panels together. Such side latches 36 and 37 also permit connecting multiple variable space shutters in a horizontal array.

Figure 9:
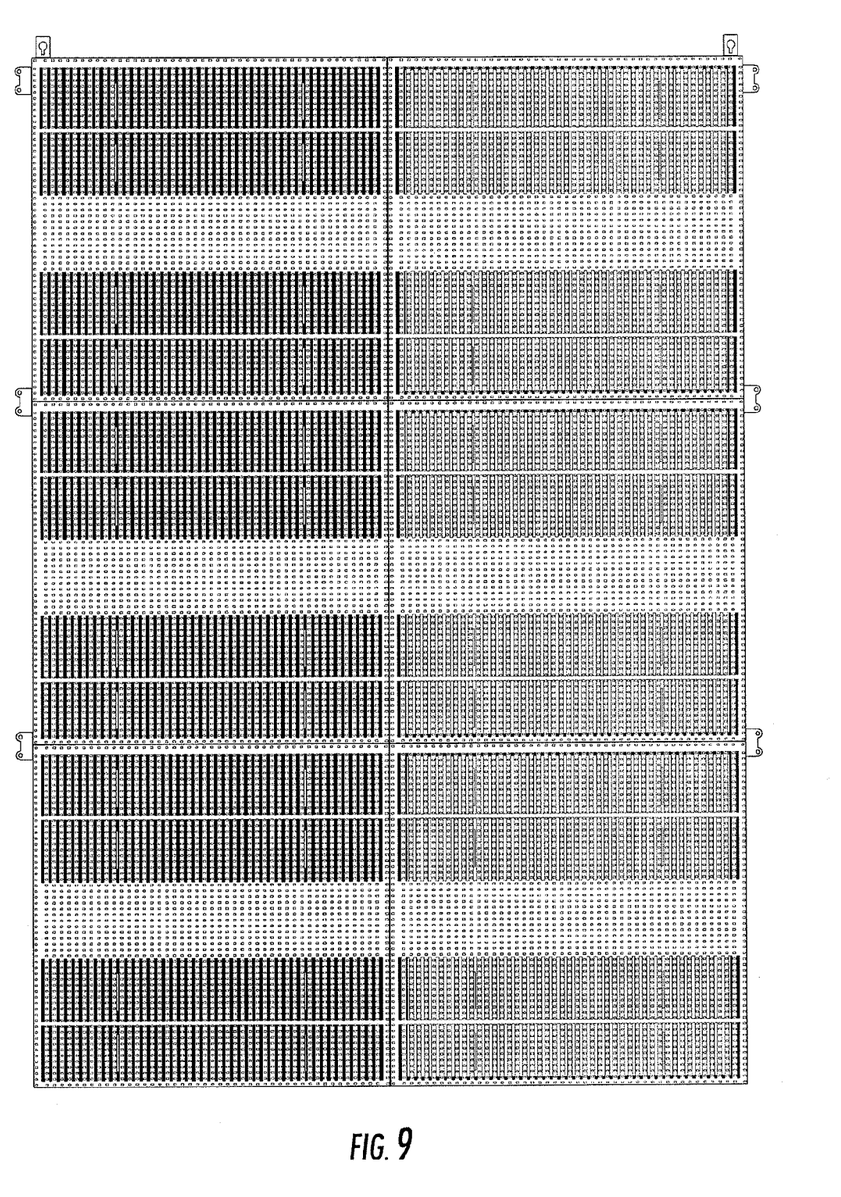
FIG. 9 is a front view of an array comprising plural variable space shutters.

FIG. 9 shows an example of a multi-panel array in accordance with an aspect of the present invention that includes 6 variable space shutters as panels in a 2×3 array, in which variable space shutters are connected in the horizontal direction as well as connected in the vertical direction. In the figure, the three panels on the left side of the figure have the shutters in the closed position, while the three panels on the right side of the figure have the shutters in the open position. As would be understood, the number of panels that can be so linked together in the horizontal and vertical directions is not limited to the disclosed example.

A variable space shutter in accordance with the present invention, either alone or in tandem with other variable space shutters connected in an array configuration, provides flexibility and easy installation for providing backing to displays, such as LED type displays to provide a see-through experience for a stage designer, in the open position, and excellent contrast in the closed position. Due to the design, the resulting shutter or shutter array is lightweight and may be thin, easy to install and dismantle, and easy to build to a desired size, by virtue of the ability of several of the variable space shutters to attach to one another to form a large multi-panel array. Moreover, due to the individual adjustability of the individual variable space shutters within a multi-panel array, a great amount of flexibility is provided to the designer as to which areas will be see-through and which areas will be solid (i.e., not see-through).

Although specific embodiments have been illustrated and described herein, it will be appreciated by those of ordinary skill in the art that a variety of alternate and/or equivalent implementations may be substituted for the specific embodiments shown and described without departing from the scope of the present invention. This provisional application is intended to cover any adaptations or variations of the specific embodiments discussed herein. Therefore, it is intended that this invention be limited only by the claims and the equivalents thereof.

What is claimed is:

1. A variable space shutter comprising:
   a first frame having vertically spaced slats forming vertical openings;
   a second frame having a horizontal indented channel, the second frame being affixed to the first frame around a periphery of the first frame; and
   a shutter part having vertically spaced slats forming vertical openings, the shutter part being sandwiched between the first frame and the second frame such that a portion of the shutter part rests within the horizontal indented channel to permit selective sliding movement of the shutter within the horizontal indented channel between a first position, in which the vertical openings of the first frame line up with the vertical openings of the shutter part, to permit light to pass through the variable space shutter, and a second position, in which the vertical openings of the first frame line up with the vertical slats of the shutter part, to block light from passing through the variable space shutter.

2. The variable space shutter according to claim 1, the shutter part further comprising vertically oriented handles configured to facilitate a user moving the shutter part between the first position and the second position.

3. The variable space shutter according to claim 1 or 2, the first frame further comprising a plurality of display mounting apertures configured to permit the mounting of LEDs within the apertures.

4. The variable space shutter according to claim 1, the first frame further comprising a horizontal portion configured to facilitate mounting of electronics for driving a light display.

5. The variable space shutter according to claim 1 or 2, the shutter part further comprising horizontal reinforcement members including oval shaped holes configured to accept screws to hold the shutter part in place within the variable space shutter and permit horizontal movement of the shutter part within the variable space shutter.

6. The variable space shutter according to claim 4, the first frame further comprising a horizontal portion adapted to facilitate mounting of electronics for driving the light display.

7. The variable space shutter according to claim 1 or 2, the second frame comprising side latches adapted to permit a variable space shutter to connect to at least one other variable space shutter to form a multi-panel variable space shutter array.

8. A multi-panel variable space shutter array comprising at least two variable space shutters, each variable space shutter comprising:
   a first frame having vertically spaced slats forming vertical openings;
   a second frame having a horizontal indented channel, the second frame being affixed to the first frame around a periphery of the first frame, the second frame comprising side latches adapted to permit a variable space shutter to connect to at least one other variable space shutter; and
   a shutter part having vertically spaced slats forming vertical openings, the shutter part being sandwiched between the first frame and the second frame such that a portion of the shutter part rests within the horizontal indented channel to permit selective sliding movement of the shutter within the horizontal indented channel between a first position, in which the vertical openings of the first frame line up with the vertical openings of the shutter part, to permit light to pass through the variable space shutter, and a second position, in which the vertical openings of the first frame line up with the vertical slats of the shutter part, to block light from passing through the variable space shutter,
   wherein each variable space shutter in the array is:
   individually adjustable between the first and second position; and
   affixed to at least one other variable space shutter by operation of the side latches.

9. The multi-panel variable space shutter array according to claim 8, the shutter part of each variable space shutter further comprising vertically oriented handles configured to facilitate a user moving the shutter part between the first position and the second position.

10. The multi-panel variable space shutter array according to claim 8 or 9, the first frame of each variable space shutter further comprising a plurality of display mounting apertures configured to permit the mounting of LEDs within the apertures.

11. The multi-panel variable space shutter array according to claim 8, the first frame of each variable space shutter further comprising a horizontal portion configured to facilitate mounting of electronics for driving a light display.

12. The multi-panel variable space shutter array according to claim 8 or 9, the shutter part of each variable space shutter further comprising horizontal reinforcement members including oval shaped holes configured to accept screws to hold the shutter part in place within the variable space shutter and permit horizontal movement of the shutter part within the variable space shutter.

13. The multi-panel variable space shutter array according to claim 11, the first frame of each variable space shutter further comprising a horizontal portion adapted to facilitate mounting of electronics for driving the light display.

* * * * *